Patented Nov. 29, 1932

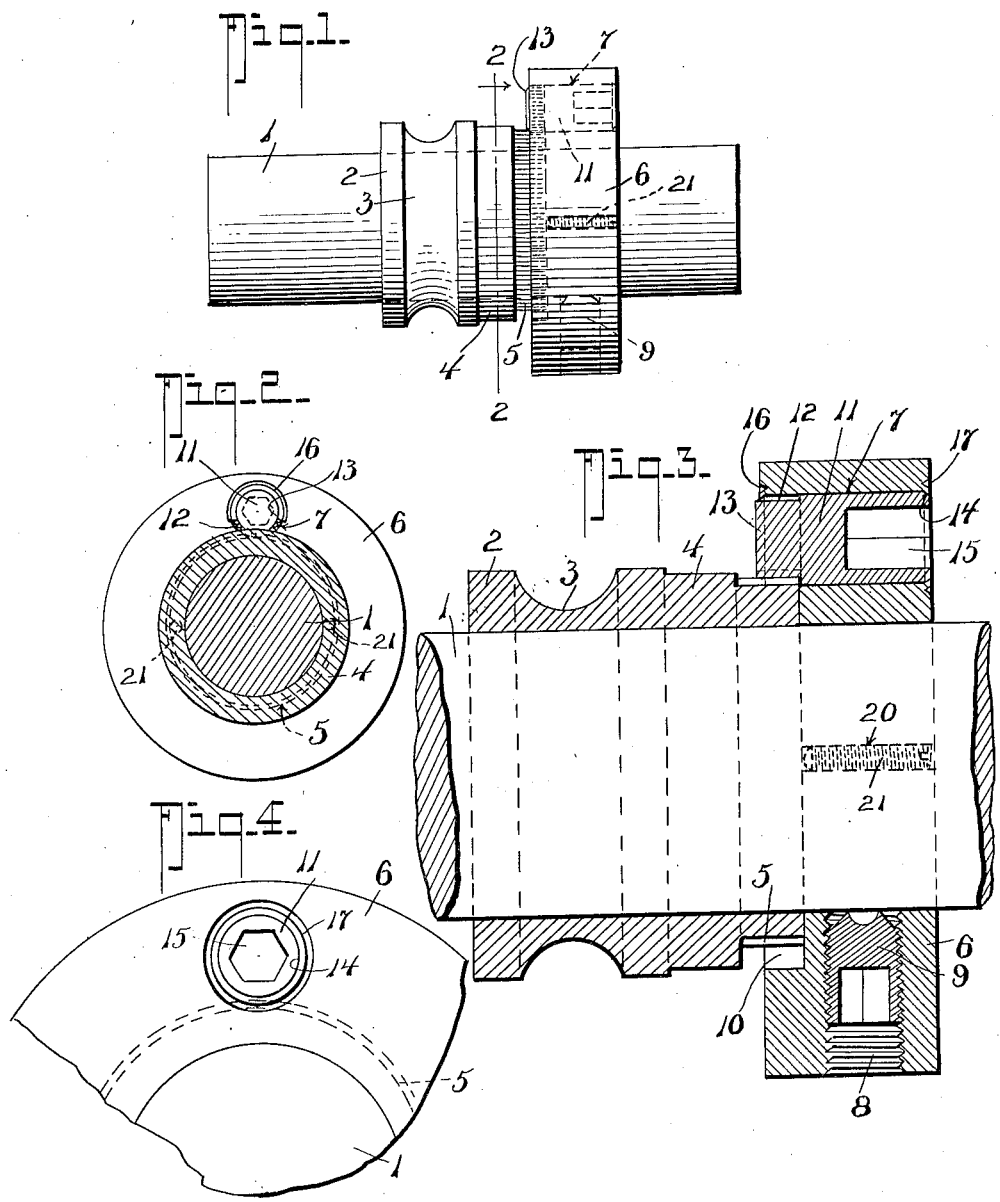

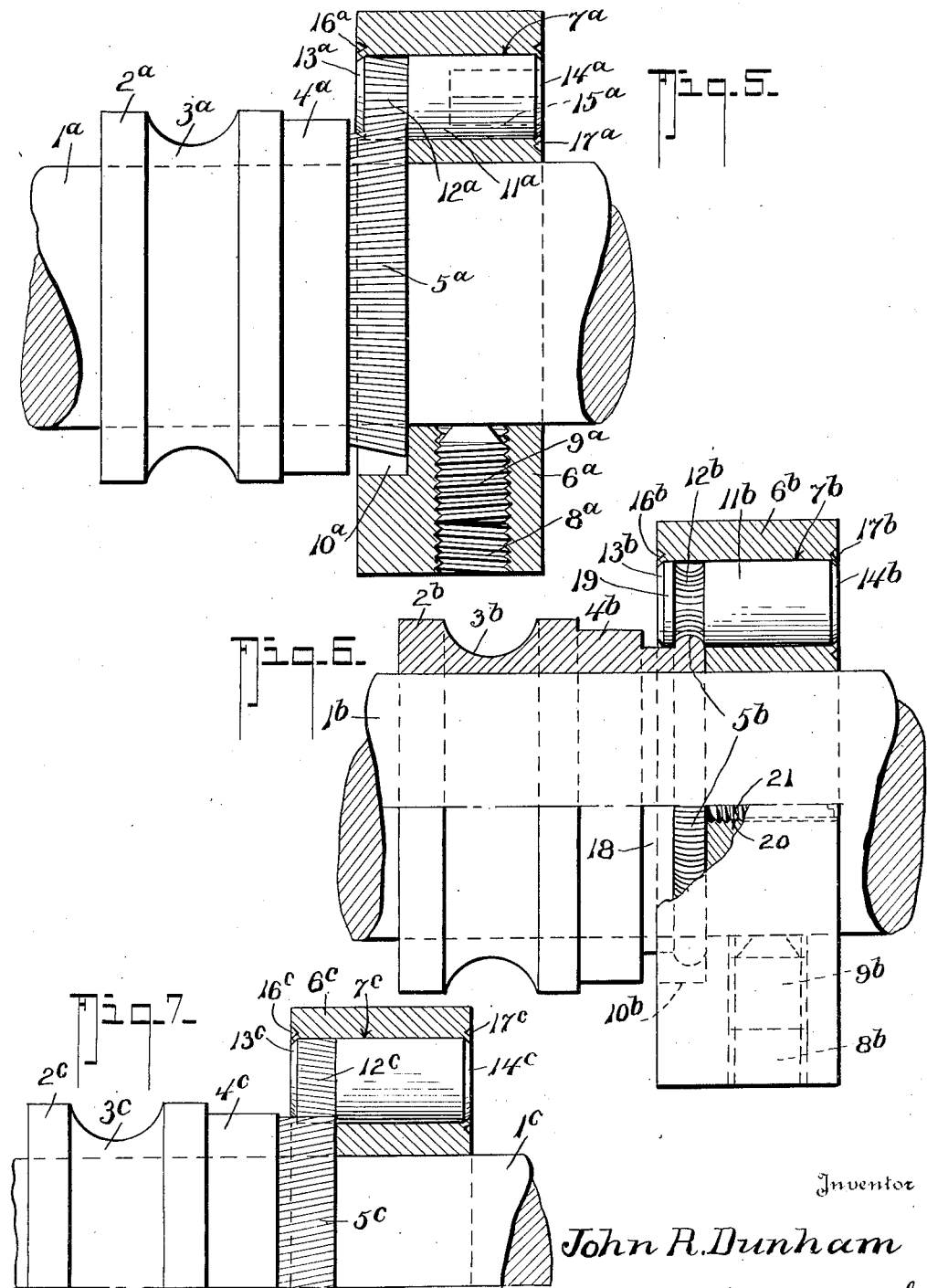

1,889,064

UNITED STATES PATENT OFFICE

JOHN RYER DUNHAM, OF NEW BRUNSWICK, NEW JERSEY

MEANS FOR LOCKING ANTIFRICTION BEARINGS TO SHAFTS

Application filed August 28, 1931. Serial No. 560,028.

My invention relates to anti-friction bearings which usually comprise an inner race and an outer race between which suitable antifriction elements such as balls or rollers are located, and the invention especially has relation to means for locking the inner race to the shaft or spindle on which it is to be fixed.

Primarily, the invention has for its object to provide a simple, effective means for securely holding or locking the bearing at a definite location on a shaft or spindle without the use of keys, nuts, or set screws between the shaft and the bearing itself, whereby the bearing will be held not only against longitudinal movement on the shaft but will also be kept from rotating on the same. Considerable difficulty has been heretofore encountered to securely hold or lock a ball or other anti-friction bearing in a certain location on a shaft. Several methods have been resorted to in an endeavor to solve this problem. Few have succeeded. Others have failed to answer the purpose, some on account of the high cost of manufacture and others because of their impracticability. There is a tendency of the inner race of an anti-friction bearing to rotate upon the shaft on which it is mounted, and it is an object of my invention to combine an anti-friction bearing with a very simple and substantial mechanism for locking the bearing to a shaft in order to prevent rotation of the bearing on the shaft and also to prevent its creeping along the shaft.

Further, it is an object to provide a device for the purposes stated which employs a locking pin whose axis parallels that of the shaft, so that it becomes unnecessary to hold the bearing against rotation while effecting the locking act.

Further, it is an object to provide a locking collar to carry a rotatable locking pin of cylindrical form having a roughened (knurled or toothed) portion to engage with a similarly roughened portion of the bearing element, one or the other of the roughened portions being eccentric to its axis of rotation, whereby rotating the locking pin will effect relative rotation between the bearing element and the locking collar to cause them tightly to grasp the shaft.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings in which:

Figure 1 is an elevation of one embodiment of my invention.

Figure 2 is a cross section on the line 2—2 of Figure 1.

Figure 3 is a vertical, longitudinal section of the parts shown in Figure 1 on an enlarged scale.

Figure 4 is a detail of a portion of the structure shown in Figure 3.

Figure 5 is part elevation and part longitudinal section illustrating a modification of the invention.

Figure 6 is a side elevation and part longitudinal section illustrating another modification of the invention.

Figure 7 is a detail view, partly in section and partly in elevation of a third modification of the invention.

In the drawings in which like numerals of reference indicate like parts in all of the figures, 1 represents the shaft, 2 the inner element of the ball bearing, which element has the race-way 3, and is provided with an extension collar 4 and a roughened portion 5.

6 represents the locking collar which is recessed at 10 to fit over the portion 5 of the element 2 and which is bored at 7 parallelly to the shaft bore of the collar to receive rotatably, the locking pin 11. The locking pin 11 is preferably held against longitudinal movement in the bore 7 by upset portions 16 and 17 produced by the use of circular or arcuate punches, which upset portions overlie the chamfered ends 13 and 14 of the locking pin. The locking pin also has a roughened portion 12 to mesh with the portion 5. It is further provided with a wrench socket 15 into which a wrench may be inserted for the purpose of turning the locking pin around, causing it to roll around the surface 5.

One or the other of the roughened, knurled or toothed surfaces, 5, 12, is formed eccentric to its axis of rotation. For convenience of illustration, and as a preferable construction, the surface 5 is formed eccentric to the axis of the element 2, while the surface 12 is formed concentric to the axis of the pin.

If it is desired, a set screw 9 may be provided in a threaded bore of the collar 6 to hold the collar against turning on the shaft 1, but if the pin 11 is turned far enough and a tight binding is effected, the use of the set screw usually is unnecessary, it being provided merely as a precautionary measure.

The roughened portions may be straight, cut parallel to the axis of the rotation of the elements, as shown in Fig. 1, or they may be spirally cut as shown in Figure 7. In that figure corresponding parts to those parts shown in Figures 1–4, inclusive, bear the same reference numbers plus the index letter "c", so a detailed description of Figure 7 is thought to be unnecessary here.

The roughened (knurled or toothed) surfaces may be formed on the cylindrical portions of the elements, Figure 1, or on frustoconical portions, as shown in Figure 5, or on convex and concave portions, as shown in Figure 6.

In Figure 5 the parts corresponding to similar parts in Figure 1 bear the same reference numerals plus the index letter "a", while in Figure 6 the same reference numbers plus the letter "b" are used.

In the modification shown in Figure 6 I prefer to provide the element 2b with an annular groove 18 between the collar part 4b and the roughened part 5b, so as to receive the ring-like portion 19 of the locking pin, thereby assisting in holding the locking collar and the bearing element against endwise separation without depending entirely on the inter-engaging surfaces 5b and 12b.

It will be seen that in assembling the parts the locking pin is slipped over the roughened portion of the bearing element at the most eccentric place and then a slight turning movement of the locking collar on the bearing element is given, sufficient to bring the roughened surfaces into engagement. Then by turning the locking pin with a wrench it will cause the locking collar to turn around the bearing element and, at the same time, the locking pin climbs up the angle of the eccentric portion with great power and exerts the necessary force to cause the locking collar and the bearing element tightly to grip the shaft 1.

In order that end play or movement may be taken out of the bearings when tapered roller bearings are used, I provide a pair of adjustment screws 21 located in diametrically oppositely disposed threaded bores 20 in the collar 6. In making such adjustment the locking collar 6 remains tightly set-screwed to the shaft; the locking pin 11 is loosened and the adjusting screws 21 are tightened up, after which the locking pin is again tightened to hold the bearing member rigid.

From the foregoing description, taken in connection with the accompanying drawings, it is thought the complete construction, operation and advantages of my invention will be clear to those skilled in the art to which it relates.

What I claim is:

1. In apparatus wherein is provided a shaft and an element to be secured thereon; a locking collar, said element and said collar being fitted on said shaft with a sliding fit, and a locking pin mounted in said collar with its axis paralleling that of the collar, said element and said locking pin having roughened engaging portions, one of which is eccentric to the axis of rotation of its member, and means in virtue of which said pin may be turned to effect relative rotation between the collar and the element for the purposes described.

2. In apparatus wherein is provided a shaft and an element to be secured thereon; a locking collar, said element and said collar being fitted on said shaft with a sliding fit, and a locking pin rotatably held in said collar with its axis paralleling that of the collar, said element having an eccentric portion whose perimeter is roughened, and said pin having a concentric portion whose perimeter is roughened and engages with said eccentric roughened portion, and means distinct from said collar and said element for turning said pin in said collar for the purposes described.

3. In apparatus wherein is provided a shaft and an element to be secured thereon; a locking collar, said element and said collar being fitted on said shaft with a sliding fit, and a locking pin rotatably held in said collar with its axis paralleling that of the collar, said element having an eccentric portion whose perimeter is roughened, and said pin having a concentric portion whose perimeter is roughened and engages with said eccentric roughened portion, said roughened portions comprising intermeshing teeth and means distinct from said collar and said element for turning said pin in said collar for the purposes described.

4. In apparatus wherein is provided a shaft and an element to be secured thereon; a locking collar, said element and said collar being fitted on said shaft with a sliding fit, and a locking pin rotatably held in said collar with its axis paralleling that of the collar, said element having an eccentric portion whose perimeter is roughened, and said pin having a concentric portion whose perimeter is roughened and engages with said eccentric roughened portion, said roughened portions on lying parallel to the axes of the elements on which they are formed and means distinct from said collar and said element for turning said pin in said collar for the purposes described.

5. In apparatus wherein is provided a shaft and an element to be secured thereon; a locking collar, said element and said collar being fitted on said shaft with a sliding fit, and a locking pin mounted in said collar with its axis paralleling that of the collar, said element having an eccentric portion whose perimeter is roughened, and said pin having a concentric portion whose perimeter is roughened and engages with said eccentric roughened portion, said roughened portions comprising intermeshing teeth which lie parallel to the axes of the elements on which they are formed.

6. In apparatus wherein is provided a shaft and an element to be secured thereon; a locking collar, said element and said collar being fitted on said shaft with a sliding fit, and a locking pin mounted in said collar with its axis paralleling that of the collar, said element having an eccentric portion whose perimeter is roughened, and said pin having a concentric portion whose perimeter is roughened and engages with said eccentric roughened portion, said roughened portions comprising spirally cut, meshing, toothlike portions.

7. In apparatus wherein is provided a shaft and an element to be secured thereon; a locking collar, said element and said collar being fitted on said shaft with a sliding fit, and a locking pin mounted in said collar with its axis paralleling that of the collar, said element and said locking pin having roughened engaging portions, one of which is eccentric to the axis of rotation of its member, and means in virtue of which said pin may be turned to effect relative rotation between the collar and the element for the purposes described, one of said roughened portions being convex while the other is correspondingly concave when viewed in the central, vertical, longitudinal section of the device.

8. In apparatus wherein is provided a shaft and an element to be secured thereon; a locking collar, said element and said collar being fitted on said shaft with a sliding fit, and a locking pin mounted in said collar with its axis paralleling that of the collar, said element and said locking pin having roughened engaging portions, one of which is eccentric to the axis of rotation of its member, and means in virtue of which said pin may be turned to effect relative rotation between the collar and the element for the purposes described, one of said roughened portions being convex while the other is correspondingly concave when viewed in the central, vertical, longitudinal section of the device, said element and said pin also having ring and groove interlocking portions for the purposes specified.

9. In apparatus wherein is provided a shaft and an element to be secured thereon; a locking collar, said element and said collar being fitted on said shaft with a sliding fit and a locking pin mounted in said collar with its axis paralleling that of the collar, said element and said locking pin having roughened engaging portions, one of which is eccentric to the axis of rotation of its member, and means in virtue of which said pin may be turned to effect relative rotation between the collar and the element for the purposes described, said locking pin having its ends chamfered and said collar having upset portions cooperating with said chamfered ends to hold the pin against longitudinal movement in the collar.

10. In apparatus wherein is provided a shaft and an element to be secured thereon; a locking collar, said element and said collar being fitted on said shaft with a sliding fit, and a locking pin mounted in said collar with its axis paralleling that of the collar, said element and said locking pin having roughened engaging portions, one of which is eccentric to the axis of rotation of its member, and means in virtue of which said pin may be turned to effect relative rotation between the collar and the element, and means carried by said locking collar to engage said element for taking up end play, for the purposes described.

11. In apparatus wherein is provided a shaft and an element to be secured thereon; a locking collar, said element and said collar being fitted on said shaft with a sliding fit, and a locking pin mounted in said collar with its axis paralleling that of the collar, said element and said locking pin having roughened engaging portions, one of which is eccentric to the axis of rotation of its member, and means in virtue of which said pin may be turned to effect relative rotation between the collar and the element, and means carried by said locking collar to engage said element for taking up end play, said means comprising adjustment screws located in the collar and paralleling the shaft with their forward ends engaging the adjacent end of said element.

12. In apparatus wherein is provided a shaft and an element to be secured thereon; a locking collar, a set screw for securing said collar to said shaft, said element having an end abutting said collar, adjustment screws on said collar to engage said abutting end to vary the distance between said element and said collar, a locking pin carried by said collar, said locking pin and said element having cooperating parts whereby upon rotation of said locking pin said collar and said element will thereby be locked against movement on the shaft.

JOHN RYER DUNHAM.